(12) United States Patent
Masuda (10) Patent No.: US 9,067,358 B2
(45) Date of Patent: Jun. 30, 2015

(54) MOLDING APPARATUS FOR GLASS MOLDED PRODUCT

(71) Applicant: ASAHI GLASS COMPANY, LIMITED, Tokyo (JP)

(72) Inventor: Kenichi Masuda, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/097,389

(22) Filed: Dec. 5, 2013

(65) Prior Publication Data
US 2014/0093605 A1 Apr. 3, 2014

Related U.S. Application Data

(63) Continuation of application No. PCT/JP2012/063438, filed on May 25, 2012.

(30) Foreign Application Priority Data

Jun. 6, 2011 (JP) ................................. 2011-126068

(51) Int. Cl.
*C03B 9/40* (2006.01)
*B29C 51/44* (2006.01)
*C03B 11/08* (2006.01)

(52) U.S. Cl.
CPC .................. *B29C 51/44* (2013.01); *C03B 11/08* (2013.01); *C03B 2215/11* (2013.01);
(Continued)

(58) Field of Classification Search
CPC .... B29K 2021/00; B29C 43/00; B29C 33/00; B29C 33/0038; B29C 33/20; B29C 33/202; B29C 51/38; B29C 51/44; C03B 11/08; C03B 2215/11; C03B 2215/12; C03B 2215/17; C03B 2215/24; C03B 2215/68; C03B 2215/16
USPC ........................................................ 425/395
See application file for complete search history.

(56) References Cited

U.S. PATENT DOCUMENTS 6,813,906 B1 * 11/2004 Hirota et al. .................... 65/323

FOREIGN PATENT DOCUMENTS

| JP | 6-321556 | 11/1994 |
|----|----------|---------|
| JP | 2001-192215 | 7/2001 |

(Continued)

OTHER PUBLICATIONS

International Search Report for corresponding International Application No. PCT/JP2012/063438, Aug. 28, 2012.
(Continued)

*Primary Examiner* — Jacob Thomas Minskey
(74) *Attorney, Agent, or Firm* — Ditthavong & Steiner, P.C.

(57) ABSTRACT

A molding apparatus for glass molded product includes a mold, a press shaft and a release device. The release device includes a release member, a push bar, and a release action mechanism. The release member has a lower end surface to face an outer peripheral portion of a molding surface of the lower die of the mold. The push bar adjusts a downward pressure given to the release member. The release action mechanism is provided to hold an upper portion of the push bar movably along a shaft direction of the press shaft. The release action mechanism moves the push bar and the release member downward along the shaft direction to release a glass material and the upper die of the mold when the upper die and the lower die are separated after the glass material has been pressed between the upper die and the lower die.

7 Claims, 6 Drawing Sheets

(52) U.S. Cl.
CPC ........ *C03B 2215/12* (2013.01); *C03B 2215/16* (2013.01); *C03B 2215/17* (2013.01); *C03B 2215/24* (2013.01); *C03B 2215/68* (2013.01)

(56) References Cited

FOREIGN PATENT DOCUMENTS

| | | |
|---|---|---|
| JP | 2007-191359 | 8/2007 |
| JP | 2011-057515 | 3/2011 |

OTHER PUBLICATIONS

Written Opinion for corresponding International Application No. PCT/JP2012/063438, Aug. 28, 2012.

International Preliminary Report on Patentability with Translation of Written Opinion of the International Searching Authority for corresponding International Application No. PCT/JP2012/063438, Dec. 27, 2013.

* cited by examiner

MOLDING APPARATUS FOR GLASS MOLDED PRODUCT

CROSS-REFERENCE TO RELATED APPLICATIONS

This application is a continuation of prior International Application No. PCT/JP2012/063438 filed on May 25, 2012, which is based upon and claims the benefit of priority from Japanese Patent Application No. 2011-126068 filed on Jun. 6, 2011; the entire contents of all of which are incorporated herein by reference.

BACKGROUND OF THE INVENTION

1. Field of the Invention

The present invention relates to a molding apparatus for glass molded product.

2. Discussion of the Background

A method for manufacturing a glass molded product by heat softening and press molding a glass material housed in a mold is becoming common in recent years. However, there is a case where the mold and the pressed glass material adhere to each other at a time of pressing and the glass material cannot be released from the mold smoothly. When such adhesion occurs, it is necessary to pause a system in order to detach the adhering glass material, and such a problem causes reduction of a productivity of a molded product.

Various techniques are studied to solve the problem, and as a particularly effective method, there is cited a molding apparatus which not only uses a thermal expansion difference by cooling after press molding but also is provided with a configuration giving a force to separate the mold and the glass material aggressively. For example, there are known a molding apparatus (JP-A 2001-192215 (KOKAI)) which is provided with a spring and a mold releasing ring in an upper die of a mold in order to give a separating force after press molding, and a mold releasing device (JP-A 6-321556 (KOKAI)) for a glass molding apparatus in which a mold releasing ring, a coupling member, and a drive device are provided and disposed almost symmetrically to an axis of an upper die.

SUMMARY OF THE INVENTION

According to one aspect of the present invention, a molding apparatus for glass molded product, includes a mold, a press shaft, and a release device. The mold has an upper die and a lower die which are disposed between an upper press plate and a lower press plate. The upper die and the upper press plate have a guide hole which passes through the upper press plate and the upper die. The press shaft extends along a shaft direction of the press shaft and is connected to the upper press plate. A glass material disposed on the lower die is pressed between the upper die and the lower die by pressing the press shaft downward. The release device is inserted into the guide hole and includes a release member, a push bar, and a release action mechanism. The release member has a lower end surface to face an outer peripheral portion of a molding surface of the lower die. The push bar adjusts a downward pressure given to the release member. The release action mechanism is provided to hold an upper portion of the push bar movably along the shaft direction. The release action mechanism moves the push bar and the release member downward along the shaft direction with respect to the press shaft to release the glass material and the upper die when the upper die and the lower die are separated after the glass material has been pressed between the upper die and the lower die.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENT

Figure 1:
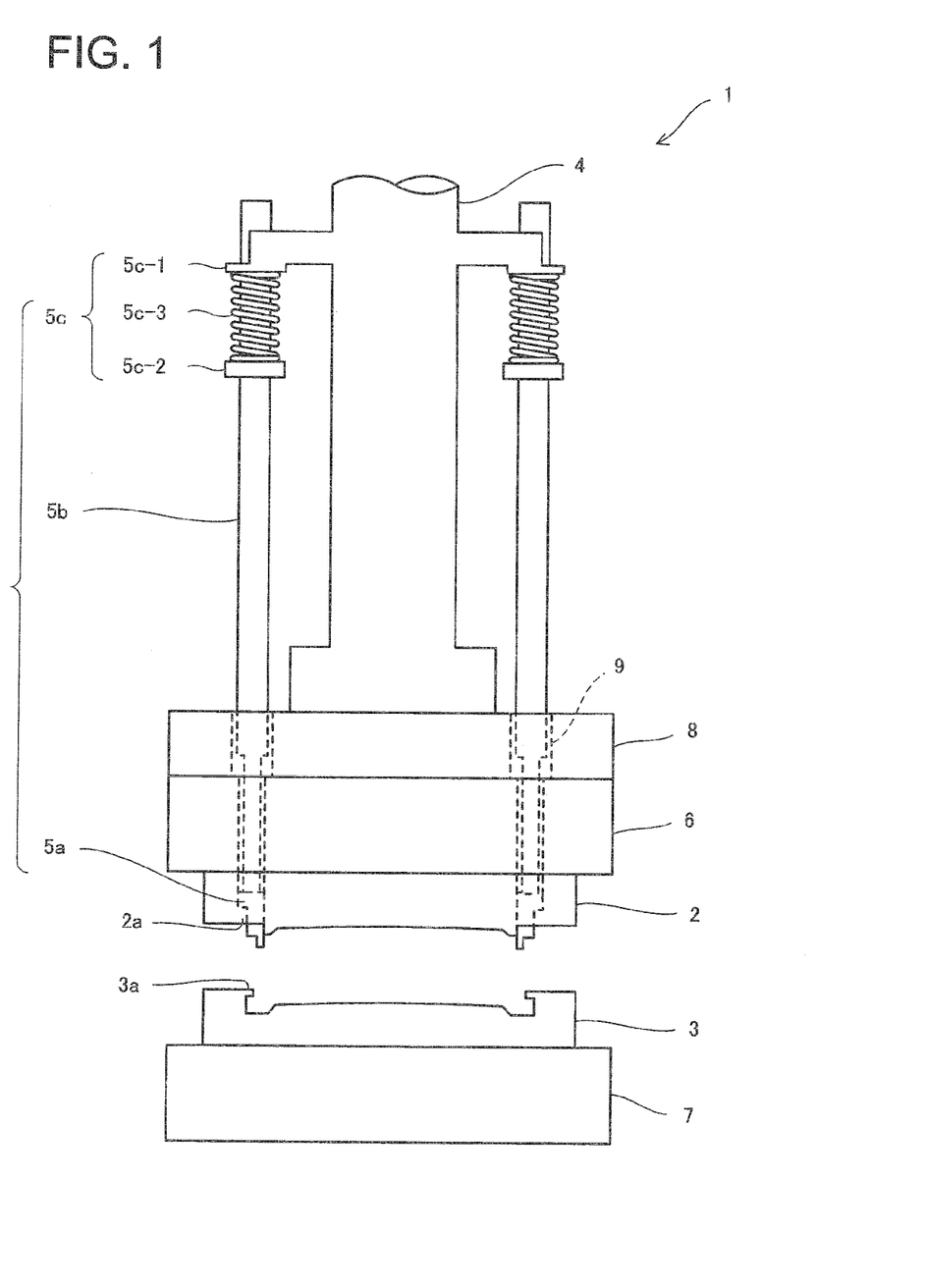
FIG. 1 is a side view showing a schematic configuration of a molding apparatus for glass molded product being an embodiment of the present invention.

Hereinafter, the embodiments will now be described with reference to the accompanying drawings, wherein like reference numerals designate corresponding or identical elements throughout the various drawings. FIG. 1 is a side view showing a schematic configuration of a molding apparatus for glass molded product being an embodiment of the present invention, a part thereof being indicated as a perspective drawing (broken line part). Further, FIG. 2A to FIG. 2E are side cross-sectional views explaining an action of a release member at a time of press molding. FIG. 2A to FIG. 2E indicate side cross-sectional views (partial side views) of a right side half of a molding apparatus 1 for glass molded product of FIG. 1.

The molding apparatus 1 for glass molded product of the embodiment of the present invention is constituted by a mold having an upper die 2 and a lower die 3 for press molding a glass material, a press shaft 4 making the upper die 2 move vertically in order for a press action by using the mold, a release means 5 (a release device) separating the mold and the glass material after press molding, an upper press plate 6 capable of keeping the upper die 2 at a molding temperature, a lower press plate 7 capable of keeping the lower die 3 at the molding temperature, and an insulating board 8 preventing a heat of the upper press plate 6 from being transmitted as it is to the press shaft 4.

Here, the embodiment of the present invention has a similar configuration to that of a common press molding apparatus except a configuration related to the later-described release means, and a press operation is performed as a result that a glass material to be a molded product is sandwiched and pressed in the mold having the upper die 2 and the lower die 3. Here, the upper die 2 forms a molded product shape of an upper side, while the lower die 3 forms a molded product shape of a lower side.

It suffices that the upper die 2 and the lower die 3 are formed of a material capable of stably giving the molded product shape by press molding, for example, a material such as cemented carbide, ceramics, and SUS, and the cemented carbide and the ceramics are preferable so as not to be deformed easily under a high temperature environment or under a high pressure at a time of press molding. Further, it is preferable to provide surfaces of the upper die 2 and the lower die 3 with release films suppressing adhesion of the molded product and the mold after press molding, such as noble metal films such as of Ir—Re, carbon films such as of DLC, and plating coats such as of Cr. Molding surfaces the upper die 2 and the lower die 3 have are in shapes corresponding to the molded product shape, but a concrete shape is not limited in particular, and can be any shape as long as the shape can be manufactured by press molding. For example, there are cited an optical element, various casings made of glass, an ornament made of glass, and so on.

Further, in the present embodiment, a shape corresponding to a release means 5 described later is provided in an outer peripheral portion of the molding surface of the upper die 2. More specifically, there is provided a guide hole 9 made to penetrate also through other members in order to make the release member 5a and the push bar 5b loosely inserted from above, and inside the guide hole 9 is provided, having a level difference, a holding portion 2a capable of holding a lower end surface of the release member 5a in a manner to protrude lower than a molding surface outer peripheral surface of the upper die 2. Further, in an outer peripheral portion of the molding surface of the lower die 3, a restricting portion 3a is provided to make a part of a tip portion of the later-described release member 5a contact an edge portion of the lower die 3 and locked thereby at a time of pressing, to restrict a lower end surface of the release member 5a to have a height similar to that of the molding surface outer peripheral surface of the upper die or higher than the molding surface outer peripheral surface. Note that "loosely inserted" here means a state of being inserted with an extra space, and the "molding surface outer peripheral surface" indicates a surface of a peripheral portion of outer side than a contour of the molding surface when viewed planely.

Additionally, in order to press mold by the upper die 2 and the lower die 3, there is provided a press shaft having a function of vertically moving at least one of the upper die 2 and the lower die 3 to approximate and separate the upper die 2 and the lower die 3. In the present embodiment, the press shaft is explained as the press shaft 4 which vertically moves the upper die 2. On this occasion, the lower die 3 can be fixed or can be vertically movable by a press shaft similarly to the upper die 2. The press shaft is connected to a not-shown cylinder, and the press shaft and a member fixed thereto are vertically movable integrally. Here, it suffices that the cylinder can vertically move each plate, and a cylinder such as an electromotive servocylinder, a hydraulic cylinder, and an electromotive hydraulic cylinder, for example, can be used.

In the present embodiment, the press shaft 4 is provided with the later-described release means 5 in a projecting manner in relation to the shaft, but the release means 5 is not necessarily required to be provided in the press shaft 4 as long as the release means 5 acts at a predetermined timing synchronously with an action of the press shaft 4.

The release means 5 is constituted by the release member 5a contacting its lower end surface directly and giving a downward force to the glass material after pressing, the push bar 5b directly contacting the release member 5a and capable of adjusting a downward pressure by vertical movement, and a spring member 5c being a release action mechanism which moves the push bar 5b downward in relation to the press shaft 4 at a predetermined timing.

The release means 5 configured as above is held in a manner that its lower end surface (lower end surface of the release member 5a) can protrude lower than the molding surface outer peripheral surface of the upper die 2 in a molding surface outer periphery of the upper die 2, to face a molding surface outer periphery of the lower die 3. Further, in order that the lower end surface does not contact the glass material pushed out to the molding surface outer peripheries of the upper die 2 and the lower die 3 at a time of pressing, the lower end surface of the release member 5a is restricted to be as high as the molding surface outer peripheral surface of the upper die 2 or higher than the molding surface outer peripheral surface. Further, here, "faces the molding surface outer periphery of the lower die 3" means that the release means 5 is disposed above the molding surface outer peripheral surface of the lower die 3.

In order to perform the above action, a tip portion of the release member 5a is provided, in an upper part than the lower end surface, with a flat surface to be a lock portion contacting the restricting portion 3a of the lower die 3 to prevent the release member 5a from moving downward any more. Further, in an upper part than the lock portion, a flat surface is provided to be a held portion by contacting the holding portion 2a in a through hole of the upper die 2 and being held at a predetermined position. In other words, the release member 5a is provided with the lower end surface, the flat surface to be the lock portion, and the flat surface to the held portion, each having a level difference in a staircase pattern. An action related to the above structure will be described later in detail.

Note that in this embodiment, the configuration is such that the spring member 5c is provided as the release action mechanism, but the above configuration is merely an example, and the configuration is not limited in particular as long as a function capable of giving a downward force in relation to the press shaft 4 at a predetermined timing is had. For example, as a release action mechanism there can be exemplified an actuator or an air cylinder such as an electromotive cylinder capable of moving the push bar 5b and the release member 5a downward in relation to the press shaft at a predetermined timing in relation to vertical movement of the press shaft 4. On this occasion, if the above-described function is secured, the release action mechanism can be provided physically separately from the press shaft 4.

Next, a configuration of the spring member 5c will be described, and the spring member 5c is constituted by a supporting arm 5c-1 projecting from the press shaft 4 and having, at a tip thereof, a guide hole through which the push bar 5b can be loosely inserted in a vertical direction, a flange 5c-2 provided lower than the supporting arm 5c-1 and fixed to the push bar 5b, and a coil spring 5c-3 inserted between the supporting arm 5c-1 and the flange 5c-2.

The push bar 5b is moved downward by the spring member 5c to give a force to the release member 5a, and as a result that the held portion of the release member 5a contacts the holding portion 2a of the upper die, the push bar 5b is usually held at a predetermined position. On this occasion, the lower end surface of the release member 5a protrudes lower than the molding surface outer peripheral surface of the upper die 2.

Further, the tip portion of the release member 5a is provided with the lock portion to contact the restricting portion 3a of the lower die at the time of pressing, and at the time of pressing, before an action of pushing completely, an upward force by contacting the restricting portion 3 is given to the release member 5a. On this occasion, though a position of the release member 5a is not changed, the press shaft 4 is moved downward and pushed completely, so that the release member 5a and the push par 5b are moved upward relatively to the press shaft 4. Then, since a relative position is changed as above, the coil spring 5c-3 is compressed, having a larger resilient force.

The restricting portion 3a restricts the lower end surface of the release member 5a to be as high as the molding surface outer peripheral surface of the upper die 2 or higher than the molding surface outer peripheral surface, in order that the lower end portion of the release member 5a does not contact the glass material pushed out to the molding surface outer peripheries of the upper die 2 and the lower die 3 at the time of pressing.

The upper and lower press plates 6, 7 are plates for holding the upper die 2 and the lower die 3 respectively and performing press molding stably, and by narrowing a distance between these plates 6, 7, a distance between the upper die 2 and the lower die 3 are narrowed, the glass material placed on the molding surface of the lower die 3 is pressed and transformed in a softened state, and molding surface shapes which the upper die and the lower die have are transferred to the glass material to make a glass molded product. The upper and lower press plates 6, 7 are provided with cartridge heaters thereinside so that the upper die 2 and the lower die 3 can be heated and kept to/at a press temperature by being contacted respectively.

Note that these upper and lower press plates 6, 7 can be a device uniaxially fixed and capable of a series of press molding of fixing an upper die 2 and a lower die 3 respectively, raising plate temperatures from a room temperature to a press temperature, pressing a glass material in a heated state, and cooling the upper die 2 and the lower die 3 as well as the pressed glass material after pressing.

Further, the molding apparatus can be a die-moving type molding apparatus which performs press molding by making a series of actions of heating, pressing, and cooling performed by different plates (heating plate, pressing plate, cooling plate) respectively and making a mold move on the respective plates in sequence. On this occasion, it is preferable that the molding apparatus is one where the lower die 3 on which the glass material is placed is moved to the respective stages in sequence and the upper die 2 is fixed to the upper press plate.

In other words, a point of the embodiment of the present invention is that the upper die 2 and the glass material are surely separated soon after pressing, and thus it suffices that a configuration has a release means described in the embodiment of the present invention in terms of timing of separating the upper die 2 and the glass material.

Note that the above-described press plates 6, 7 have cartridge heaters inserted into and fixed to the inside of a material of stainless steel, cemented carbide, alloy steel or the like, and can be kept at a desired temperature as a result of heating of the cartridge heater and raising a temperature of the plate.

Further, the insulating board 8 is a member to prevent a heat of the press plate 6 from being transmitted directly to a press shaft 4 side, and a known insulating board of ceramics, stainless steel, die steel, high speed steel, or the like is used. Preferable among the above is ceramics, which has a high hardness and is hard to be deformed even by a pressure or the like at a time of press molding, rarely bringing about displacement. When the die steel or the high speed steel is used, it is preferable to perform a coating processing of CrN, TiN, TiAlN on a surface.

Next, actions of the release means of the embodiment of the present invention will be described with reference to FIG. 2A to FIG. 2E.

Figure 2A:
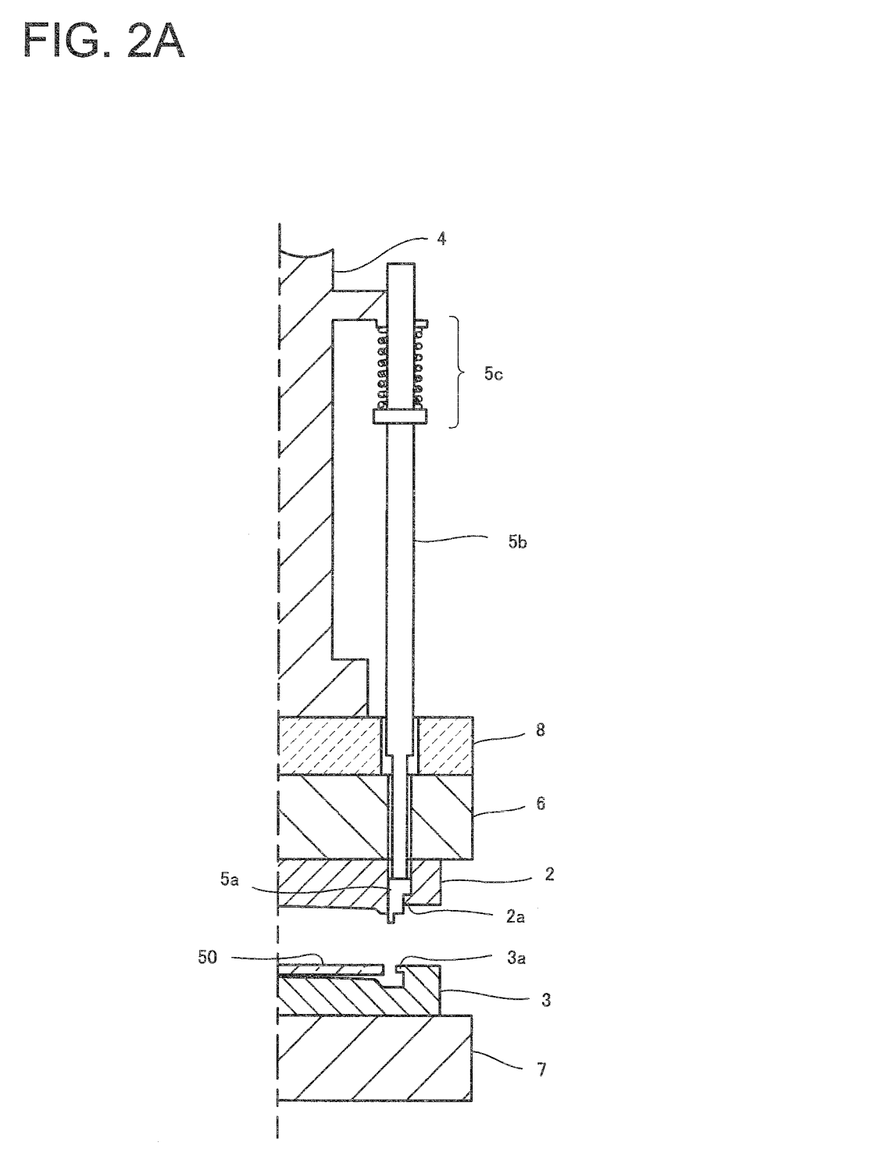
FIG. 2A is a side cross-sectional view explaining an action of a release member at a time of press molding in the molding apparatus for glass molded product of FIG. 1.

First, the lower die 3 on the molding surface of which the glass material 50 is placed is disposed in the molding apparatus 1 for glass molded product (FIG. 2A).

If the molding apparatus 1 for glass molded product is a molding apparatus of uniaxially fixed type, the glass material 50 is placed on the molding surface of the lower die 3 fixed to the press plate 7 in a state where the device itself is at a sufficiently low temperature before the press plate 7 is heated by the cartridge heater. Generally, transformation becomes easy when a glass material 50 is heated to equal to or higher than a softening point, and thus a pressing operation is performed after heating to equal to or higher than the softening point is done. In a case of a glass material with a high reactivity such as an optical glass, since a phenomenon of cloudiness of a surface or the like appears when a temperature is raised to a softening point, the temperature is set to a temperature between a yield point (At) and the softening point. On this occasion, it is preferable that a heating speed is about 5 to 300° C./min, and it is more preferable that the heating speed is about 30 to 300° C./min.

For above-described heating, a heater can be provided other than the cartridge heater, for heating the glass material 50 itself. Then, after the glass material 50 is heated sufficiently, the action shifts to a next action.

Further, in a case where the molding apparatus 1 for glass molded product is a part of a mold moving type molding apparatus, in which respective processings are performed in different places of a heating stage, a pressing stage, and a cooling stage, the molding apparatus 1 for glass molded product described here indicates a configuration in the pressing stage. On this occasion, the glass material 50 is placed on the lower die 3 in advance out of the device, the above is integrally conveyed into the device, being conveyed to the heating stage, the pressing stage, and the cooling stage in sequence so that the respective processings are performed. Therefore, the glass material 50 and the lower die 3 which have been heated sufficiently in the heating stage are conveyed as it is onto the press plate 7, and a state of FIG. 2A is brought about. On this occasion, the upper die 2 is fixed to the press plate 6 and has been heated sufficiently so that a press operation can be performed. Further, the press plate 7 has also been heated so as to be able to perform a press action immediately without letting a temperature of the conveyed lower die 3 decrease.

Here, in the release means 5, its push bar 5b is inserted into the guide holes 9 which are provided in the insulating board 8 and the press plate 6, in a manner to be loosely inserted from above, and the lower end surface of the push bar 5b contacts the upper portion of the release member 5a. The release member 5a is held by the holding portion 2a provided in the guide hole 9 of the upper die 2, and is configured not to be lowered downward any more. Further, the push bar 5b is given a downward force by the spring member 5c, and the release member 5a is in a state of being lightly pressed to the holding portion 2a by the push bar 5b at this time. Further, the tip portion of the release member 5a is formed so that each of the lower end surface, the lock portion, and the held portion has a level difference in a staircase pattern, as described above, and the lower end surface protrudes lower than the molding surface outer peripheral surface of the upper die 2.

Next, the upper die 2 and the lower die 3 are made approximate to each other, and in the present embodiment, the lower press plate 7 is fixed, the upper press plate 6 being connected to the press shaft 4 via the insulating board 8 and the upper die 2 being fixed to the upper press plate 6. Therefore, by moving the press shaft 4 vertically, the upper press plate 6 and the upper die 2 are also integrally moved vertically, so that the press action can be performed.

Figure 2B:
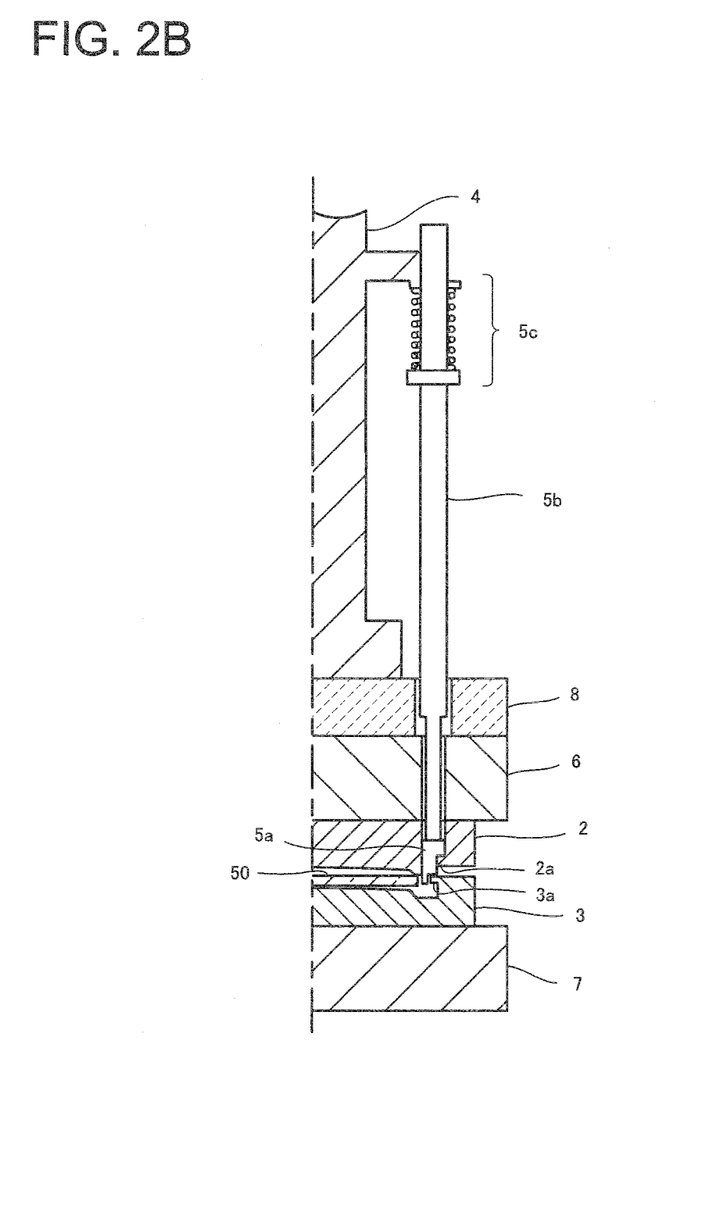
FIG. 2B is a side cross-sectional view explaining an action of the release member at the time of press molding in the molding apparatus for glass molded product of FIG. 1.

When the upper die 2 is lowered by the press shaft 4 from the state of FIG. 2A and the upper die 2 and the lower die 3 are made approximate, in the present embodiment, first, the lock portion of the release member 5a contacts the restricting portion 3a of the lower die 3, the release member 5a being restricted not to move downward any more (FIG. 2B).

Figure 2C:
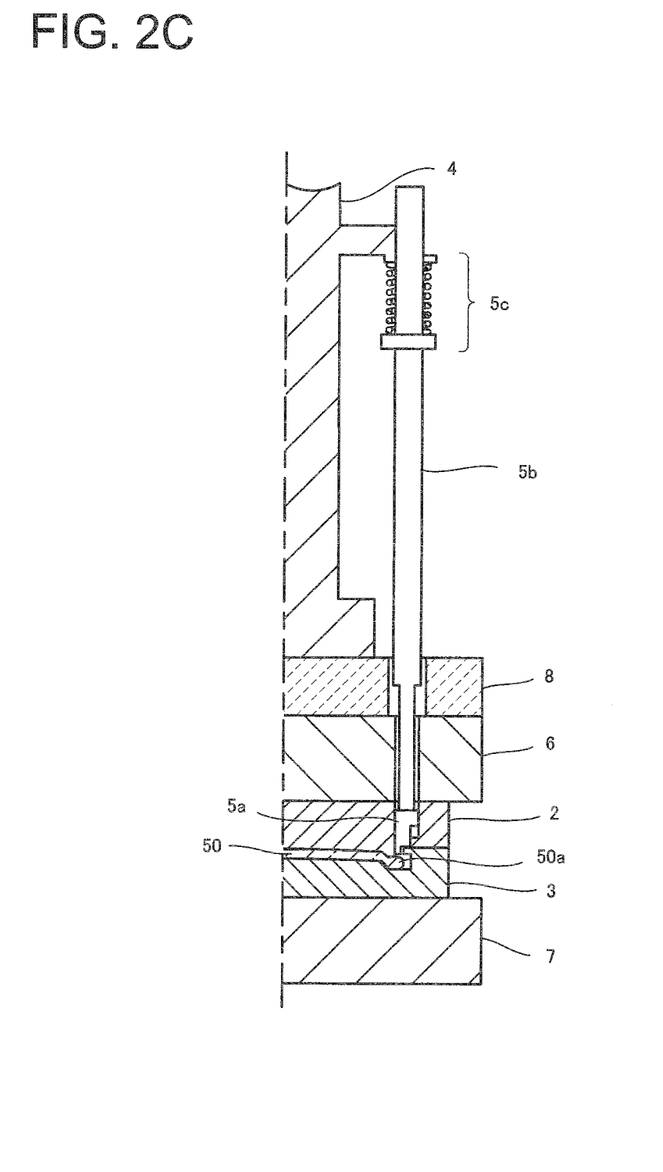
FIG. 2C is a side cross-sectional view explaining the action of the release member at the time of press molding in the molding apparatus for glass molded product of FIG. 1.

Further, when the upper die 2 is moved downward by the press shaft 4, the release member 5a cannot be lowered any more as described above and is restricted at that position. On the other hand, the member fixed to the press shaft 4 is moved further downward, and presses the glass material 50 so that the molding surface shapes of the upper die 2 and the lower die 3 are transferred to the glass material 50. On this occasion, since a lower end portion of the coil spring 5c-3 of the spring member 5c is fixed and an upper end portion thereof is pressed downward by the press shaft 4, the coil spring 5c-3 is compressed and has a larger resilient force (FIG. 2C).

Further, in this press action, since the release member 5a is restricted and the upper die 2 is further lowered, the lower end surface of the release member 5a comes to a position as high as or higher than the molding surface outer peripheral surface of the upper die 2. As described above, the release member 5a is moved relatively upward in relation to other members, and thereby does not prevent moving of a surplus glass material 50a pushed out to a molded surface outer periphery of the pressed glass material 50. In other words, the surplus glass material 50a gets into under the release member 5a (FIG. 2C).

After the press action is finished as above, the temperatures of the upper and lower press plates 6, 7 are lowered, the molded glass material 50 being cooled and solidified. It is preferable that cooling is done to equal to or lower than a glass transition point (Tg) of the glass material, and it is more preferable that the cooling is done to a temperature equal to or lower than a strain point of the glass material. On this occasion, it is preferable that a temperature fall speed is about 5 to 150° C./min, and it is more preferable that the temperature fall speed is about 15 to 150° C./min.

Figure 2D:
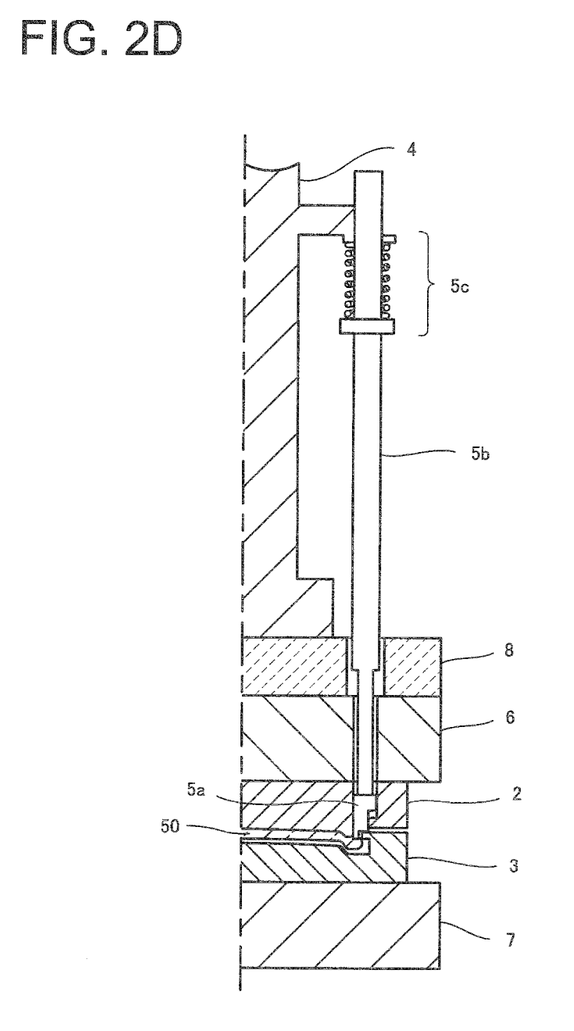
FIG. 2D is a side cross-sectional view explaining the action of the release member at the time of press molding in the molding apparatus for glass molded product of FIG. 1.

When the glass material 50 is sufficiently cooled, the upper die 2 is raised by the press shaft 4 and the upper die 2 and the lower die 3 are separated from each other. On this occasion, the pressed glass material 50 is sometimes released spontaneously, but in many cases the pressed glass material 50 adheres to the upper die 2. In the present embodiment, even in a case where the glass material 50 adheres to the upper die 2, the surplus glass material 50a having been pushed out to the molded surface outer periphery contacts the lower end surface of the release member 5a soon after the upper die 2 is raised (FIG. 2D).

Figure 2E:
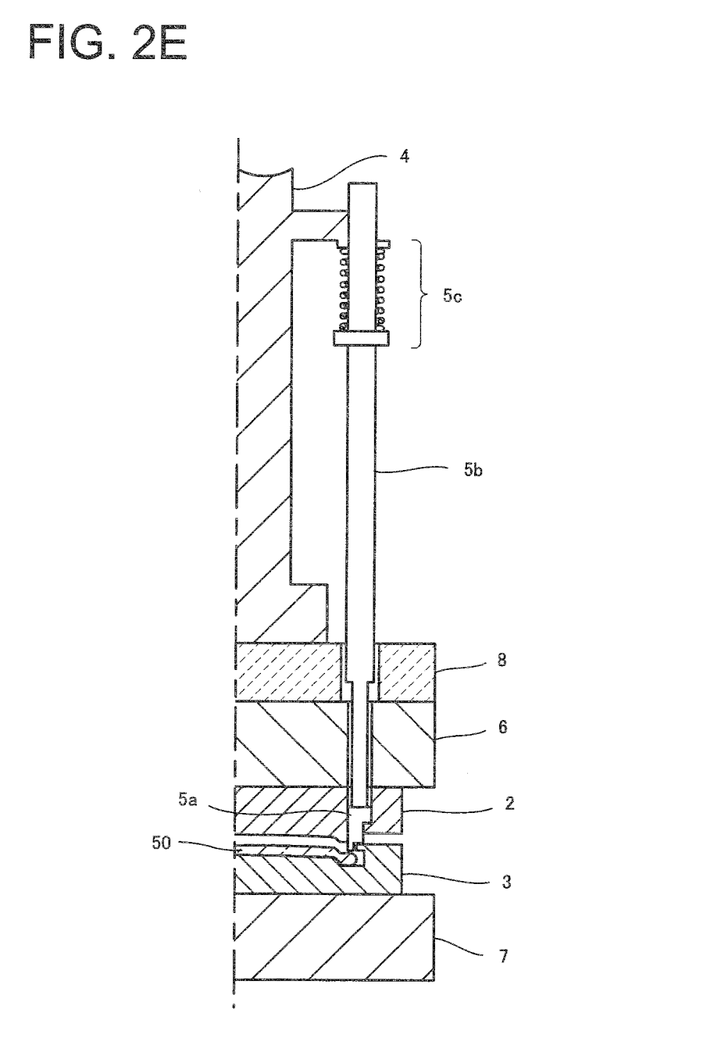
FIG. 2E is a side cross-sectional view explaining the action of the release member at the time of press molding in the molding apparatus for glass molded product of FIG. 1.

When the upper die 2 is further raised, the release member 5a, since compression of the spring member 5c being not sufficiently released due to the push bar 5b and a force to move downward in relation to the press shaft 4 and the upper die 2 working, protrudes gradually from the molding surface outer peripheral surface of the upper die 2. Then, the release member 5a gives a downward force to the glass material 50a, the entire glass material 50 is released from the upper die 2, and releasing is surely performed (FIG. 2E).

When the upper die 2 is further raised, the held portion of the release member 5a contacts the holding portion 2a of the upper die 2 again, and thereafter is raised together with the upper die 2, a state returning to the state of FIG. 2A. Thereafter, the molded glass material 50 is taken out and subjected to a predetermined processing, to be a glass molded material as an end product.

As described above, the force releasing the glass material from the mold is given by a force of contacting of the lower end surface of the release member 5a and the surplus glass material 50a. However, if a substantially biased force is given, the glass material is sometimes released with a part of the molded product adhering to the mold, and the molded product is not able to become a product. Therefore, it is preferable that the number of the release means is two or more in order that the force of releasing acts on the molded product as evenly as possible. On that occasion, it is preferable that the release means are disposed in positions symmetrical in relation to a plane center of the molded product. Note that it suffices that the release member 5a is provided as the release means at a position where the push bar 5b is, as described above, and the release member 5a can be provided only in a push bar 5b part or provided along an outer periphery of a plane shape of the molded product including the push bar 5b part in a similar figure to the plane shape. On this occasion, the release member is made slightly larger than the molded product, in a size where the release member is caught to the surplus glass material pushed out to the outer periphery portion at the time of pressing. Further, the release member can have a shape lacking a part of the similar shape, and, for example, in a case of a casing with a rectangular plane shape, a configuration can be such that one edge or two facing edges among four edges is (are) provided with (a) release member(s) contacting the entire of the edge(s), the other edges not being provided with the release member. In this case, one push bar 5b can be provided in a center of that edge, two push bars 5b can be provided near both ends of the edge, or a push bar in addition to the above can be provided, and it suffices that downward pressures can be given to the entire release member at almost the same timing.

In the embodiment of the present invention, the molding apparatus for glass molded product, includes: a mold having an upper die and a lower die disposed between upper and lower press plates, the upper die and the upper press plate having a guide hole respectively; a press shaft configured to fix the upper press plate to press mold a glass material disposed on the lower die; a release member loosely inserted into the guide hole to penetrate through the upper press plate and upper die, the release member having lower end surface configured to face a molding surface outer peripheral portion of the lower die; a push bar configured to adjust a downward pressure given to the release member; and a release action mechanism provided to project from the press shaft, the release action mechanism vertically movably holding an upper portion of the push bar, the release action mechanism moving the push bar and the release member downward in relation to the press shaft for releasing the glass material and the upper die when making the upper die and the lower die separate after pressing by the press shaft.

According to the molding apparatus of glass molded product of the embodiment of the present invention, a glass material having been press molded can be surely released from an upper die and it is possible to eliminate the number of system stops caused by insufficient releasing. Further, a molding apparatus of glass molded product in which a release means of the embodiment of the present invention is embedded can be made as large as a conventional press molding apparatus and conventional components can be used in many places, enabling maintenance of space saving and suppression of cost increase through an improvement of a productivity.

A molding apparatus for glass molded product of the embodiment of the present invention can surely separate a mold and a glass material essential for manufacturing a glass molded product by press molding, and thus can be broadly used in a field of press molding.

Obviously, numerous modifications and variations of the present invention are possible in light of the above teachings. It is therefore to be understood that within the scope of the appended claims, the invention may be practiced otherwise than as specifically described herein.

What is claimed is:

1. A molding apparatus comprising:
a mold having an upper die and a lower die which are disposed between an upper press plate and a lower press plate, the upper die and the upper press plate having a guide hole which passes through the upper press plate and the upper die;
a press shaft extending along a shaft direction of the press shaft and connected to the upper press plate and configured to press a glass material, if disposed on the lower die between the upper die and the lower die, by pressing the press shaft in the shaft direction; and
a release device inserted into the guide hole, wherein the release device includes:
   a release member having a lower end surface to face an outer peripheral portion of a molding surface of the lower die,
   a push bar to adjust a downward pressure given to the release member, and
   a release action mechanism configured to hold an upper portion of the push bar movably along the shaft direction, the release action mechanism configured to move the push bar and the release member along the shaft direction with respect to the press shaft to release the glass material and the upper die when the upper die and the lower die are separated after the glass material has been pressed between the upper die and the lower die.

2. The molding apparatus according to claim 1, wherein the release action mechanism includes:
a supporting arm projecting from the press shaft and having a hole at a tip of the supporting arm, the push bar being inserted into the hole movably along the shaft direction,
a flange provided around the push bar and at a position lower than a position of the supporting arm, and
a coil spring inserted between the supporting arm and the flange.

3. The molding apparatus according to claim 2, wherein the release member includes:
a lock portion to engage with an edge portion of the lower die so that a lower end surface of the release member is positioned approximately as high as or higher than an outer peripheral portion of a molding surface of the upper die when the press shaft is lowered resisting to a resilient force of the coil spring, and
a held portion to be held by the upper die so that the lower end surface of the release member protrudes lower than the outer peripheral portion of the molding surface of the upper die when the press shaft is lowered and the lock portion is not engaged with the edge portion of the lower die.

4. The molding apparatus according to claim 1, wherein the release action mechanism includes an actuator.

5. The molding apparatus according to claim 1, wherein the release action mechanism includes an air cylinder.

6. The molding apparatus according to claim 1, wherein two or more the release members are provided in positions symmetrical about a center of a molded product.

7. The molding apparatus according to claim 1, wherein the release member is shaped to an outer periphery of a molded product in a planar view, and is provided along the outer periphery of the molded product.

* * * * *